April 30, 1957   V. G. VOLLAND   2,790,252
FORM FOR AUTO SEAT COVER DISPLAY
Filed June 30, 1954   3 Sheets-Sheet 1
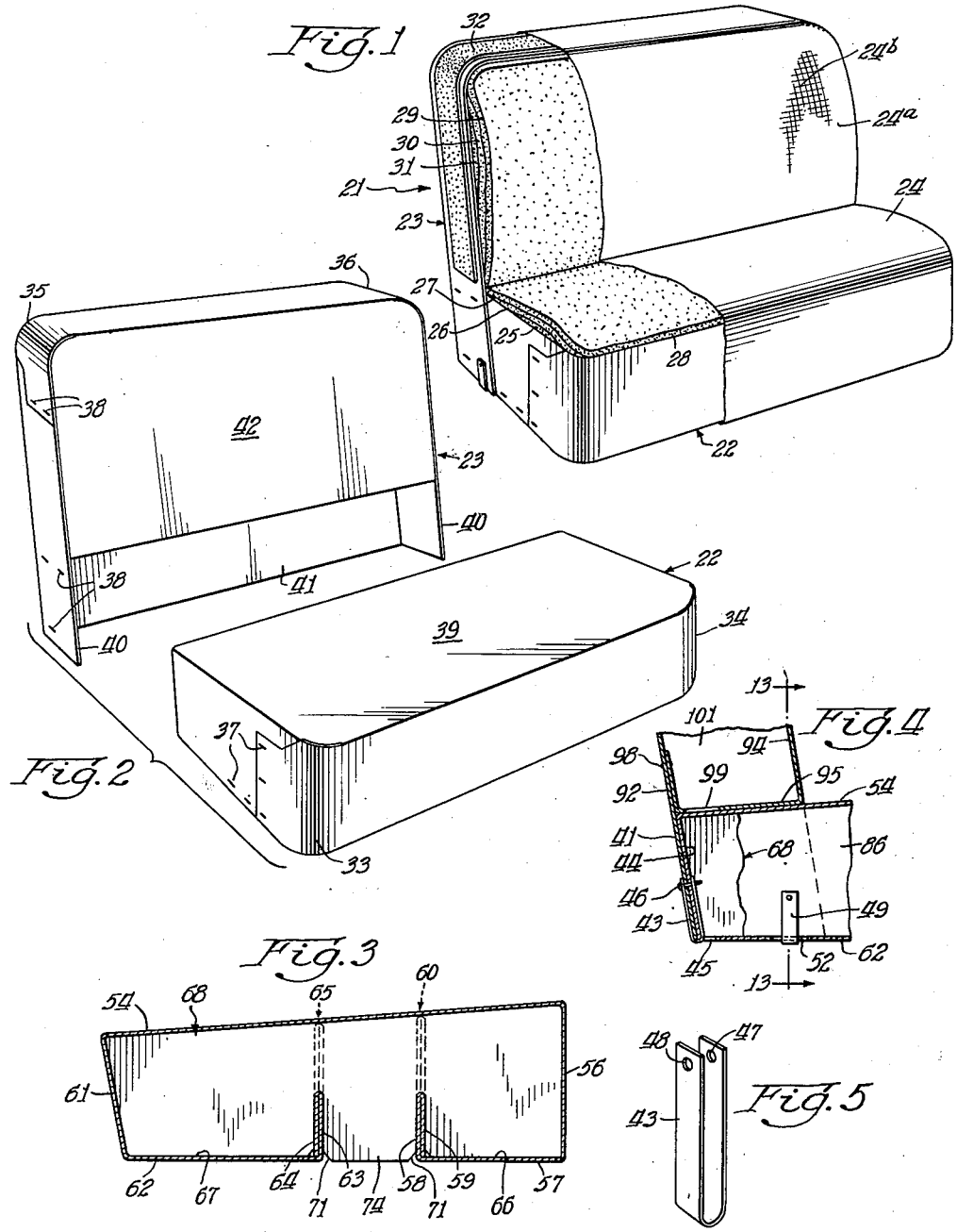
Inventor:
Vernon G. Volland
By: Vernon C. Berdine
Atty.

April 30, 1957 V. G. VOLLAND 2,790,252
FORM FOR AUTO SEAT COVER DISPLAY
Filed June 30, 1954 3 Sheets-Sheet 2
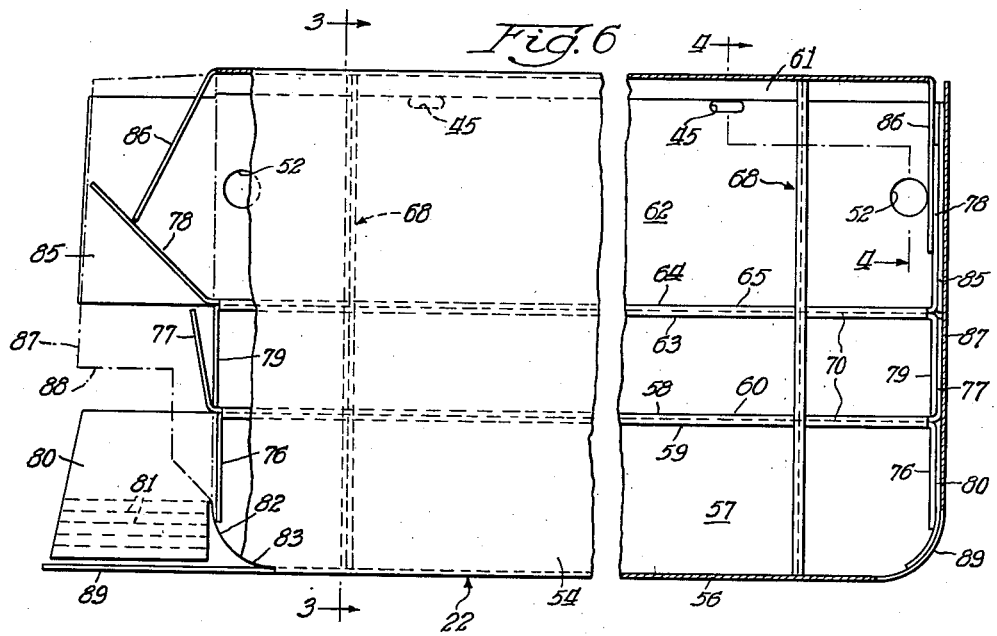
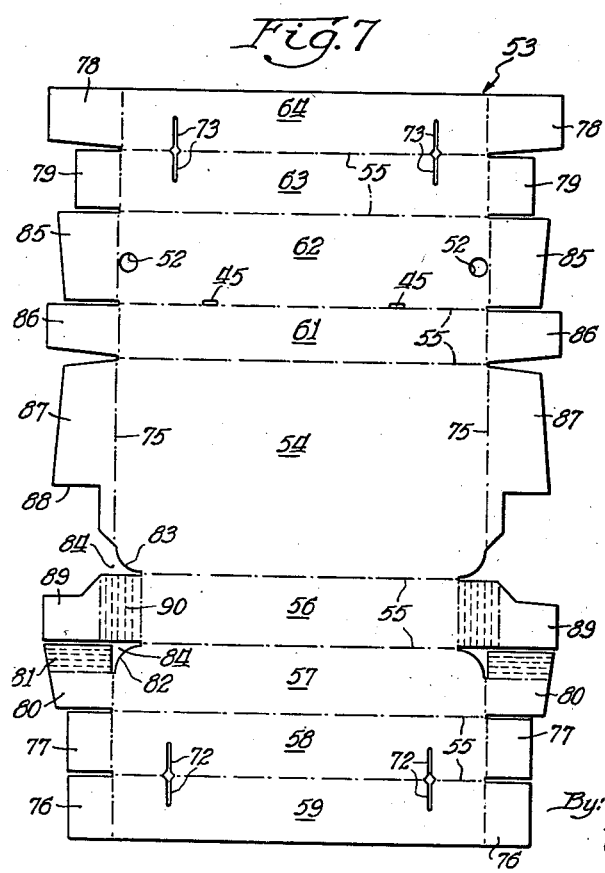
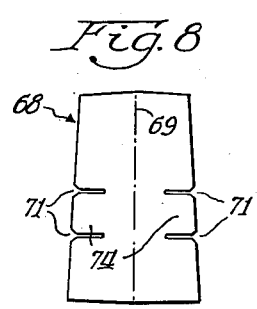
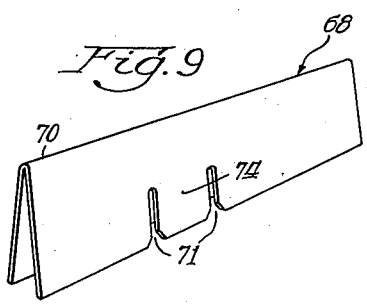
Inventor:
Vernon G. Volland
By: Vernon C. Berdine
Atty.

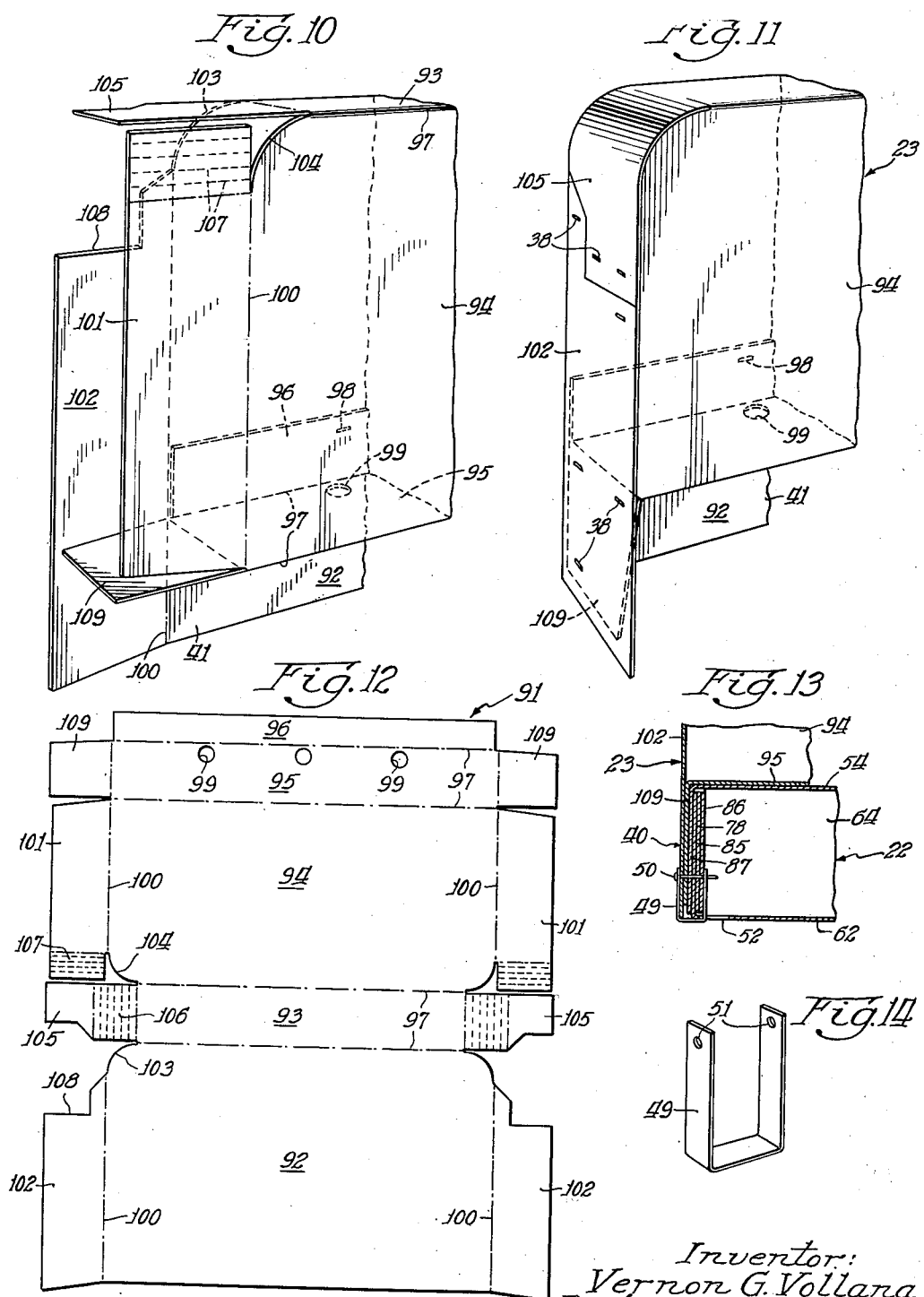

United States Patent Office 2,790,252
Patented Apr. 30, 1957

2,790,252

FORM FOR AUTO SEAT COVER DISPLAY

Vernon G. Volland, Glencoe, Ill.

Application June 30, 1954, Serial No. 440,418

14 Claims. (Cl. 35—49)

This invention relates to form for automobile seat cover display that may be manufactured in large quantities at a minimum cost from sheet cardboard or the like, initially in flat form, the blanks struck out therefrom being thereafter bent to built-up or box-shape to provide a structure having strength and appearance approximating that of an actual automobile seat and back.

It has been found that the prospective customer for an automobile seat cover is usually not satisfied to see the material which he contemplates purchasing merely in the bolt or piece goods but desires to see the proposed covering as it will look on an automobile seat. Such a demonstration by the merchandiser takes time and is even then not entirely satisfactory since merely laying a piece of goods over the seat does not produce the actual effect in use. In the case of completely sewn seat covers, sometimes already packaged, it is impractical for the merchandiser to take the time to fit them onto the customers's car merely for demonstration purposes. Satisfaction of the customer may be effected and time of the merchandiser saved by providing a form or dummy upon which sample seat covers of different patterns and material may be displayed. Such forms to be practical must be inexpensive in construction while being light, strong and durable, and it is the aim of the present invention to provide such a form that will eminently meet these requirements.

The form of the present invention is capable of construction practically in either full size, to take a full size seat covering, or in reduced size to accommodate reduced size sample seat covers. In either size, by means of the present invention, a seat form is provided which closely approximates an actual seat in strength and appearance and which provides a complete seat display for the seat cover, permitting the prospective customer to see how the cover will look when actually in use. If in full size, the form must be strong enough to support the weight of the prospective purchaser if he sits on it and even in reduced size it must be strong enough to support his leaning weight.

In an important aspect of the invention the seat and back members are formed separately and are secured together in position simulating actual use by readily removable fasteners, the seat and back when assembled being partially telescoped whereby the back lower part receives the rear margin of the seat part further simulating actual use.

In another aspect of the invention the blanks have cut-outs, flaps, and tongues arranged for reinforcements and providing round corners at the front corners of the seat and at the top corners of the back to simulate actual appearance of an automobile construction, and desirably the faces of the back and seat are overlaid by padding which is sloped toward the front edge of the seat and toward the upper edge of the back, while being rounded intermediately, to maintain the seat covers in snugly stretched position closely approaching the arrangement on an actual automobile seat.

These and other objects and advantages will be apparent from the following description, taken together with the accompanying drawings, of an illustrative embodiment of the invention, and in which drawings—

Figure 1 is a perspective view of the assembled form with a cover applied thereto, the cover being broken away for purposes of description;

Figure 2 is a separated view of the back and seat members shown in Fig. 1;

Figure 3 is a cross-section through the seat taken on the line 3—3 of Fig. 6;

Figure 4 is a staggered section on the line 4—4 of Fig. 6;

Figure 5 is a perspective view of one of the fastening means shown in Fig. 4;

Figure 6 is a plan view on a larger scale than Figs. 1 and 2 of the seat shown in previous figures, partially broken away and showing at one end a development stage in the making thereof, and further broken away to reduce space;

Figure 7 is a plan view, reduced in scale from Fig. 6, of the blank in initial flat form for making the seat member previously referred to;

Figure 8 is a plan view of the blank for one of the cross-reinforcements shown in Figs. 3, 4 and 6.

Figure 9 is a perspective view, on a somewhat larger scale than Fig. 8, of the reinforcement of the latter figure when folded;

Figure 10 is a fragmentary perspective view of one end of the back member showing a development stage in the making thereof;

Figure 11 is a completely developed skeletal view of the structure of Fig. 10 also showing one end of the back member shown in Fig. 2;

Figure 12 is a plan view, similar to Fig. 7, but showing a blank initially flat for making the back member of the form;

Figure 13 is a fragmentary section taken on the line 13—13 of Fig. 4; and

Figure 14 is a perspective view of the fastening means shown in Figs. 4 and 13.

Referring in detail to the illustrative construction shown in the drawings, the numeral 21 indicates an assembled form which comprises a seat member 22 and a back member 23. Fig. 1 shows the form as used to display a sample seat cover 24 (for the seat) and 24a (for the back) of any predetermined pattern, weave or material 24b. The upper face 39 of the seat is desirably overlaid with padded laminations in this instance 25, 26 and 27, the lamination 25, or the lower most of the three being of reduced area, and the lamination 26 of slightly less reduced area with respect to the upper lamination 27 so as to provide a rounded or camber effect for the seat, particularly at the front edge 28 so that the covers 24 and 24a are stretched tightly thereover and are well filled out to simulate the effect produced in actual use. Similarly the back 23 has its face 42 overlaid with corresponding padding laminations 29, 30 and 31. These laminations may be of pressed fluff cotton or any other suitable padding material. To further pad the edges of the back 23 a felt strip 32 is here shown running around the ends and top of the back. The laminations and the felt strip may be suitably glued or otherwise attached to the parts.

It will be understood and readily seen by reference to Fig. 2 that the seat 22 and back 23 are separable, both for the purpose of applying their respective covers 24 and 24a thereto and also for the purpose of permitting a so-called knock-down of the parts to facilitate shipment with or without the covers 24 and 24a thereon. It will be understood that the seat 22 and back 23 as seen in Fig. 2 have not yet had applied thereto the padding previously referred to with respect to Fig. 1. This padding and the seat coverings themselves are omitted in Figs. 2, 3 and 4 merely for purposes of facility of description.

As will be later more particularly described herein, the seat 22 and back 23 are each constructed from a blank initially formed in the flat and later folded to box-shape for the parts respectively so as to provide a light but strong and durable structure simulating an actual automobile seat construction and having for exactitude of simulation the rounded corners 33 and 34 at the front edge of the seat and 35 and 36 at the upper corners of the back. The cardboard when folded to the respective parts may be stapled together in the shapes indicated as by staples 37 for the seat 22 and 38 for the back 23.

As best seen in Figs. 1 and 4, both for purposes of enhanced strength and for preciseness of simulation, the seat member 22 is received in a recess in the lower edge of the back member 23 as by having the seat member rear margin somewhat telescopically and snugly entered between the depending side bibs 40 of the back member and in abutment with the depending skirt 41 of the back so that the back rests on the seat 22 as best seen in Fig. 4.

In the position last referred to and as seen in Figs. 1 and 4 the seat and back may be removably secured together by separable fastening means such as a clip or inverted U-shape metal clevis 43 that slips up onto the abutting rear wall 44 of the seat and skirt 41 of the back through a perforation 45 in the rear lower wall 62 of the seat. Self-tapping screw 46 may be entered in mating perforations 47 and 48 in the upper free ends of the clip 43 to pass through the cardboard material and secure the clips removably in position. There may be a plurality, such as two or more of these fastening means spaced along the back.

Similarly at the sides of the structure a clip 49 (Figs. 4 and 14) may be employed which is passed upwardly over the lower edges of abutting folds of the cardboard as shown in cross-section in Fig. 13 and clamping the folds of the seat to the depending bib 40 of the back by the aid of a self-tapping screw 50 that passes through mating perforations 51 in the upper free ends of the clip 49, the clip being given access to the lower edges of the folds and bib through a perforation 52 in the rear lower wall 62 of the seat member. To accommodate a greater number of folds at the side of the form than along the back the clip 49 has its legs spaced farther apart than the clip 43.

Turning now to the blanks for the parts, an illustrative construction for the seat member 22 is shown in Figs. 6 to 9 inclusive, as next described:

Fig. 7 shows an illustrative blank 53 for this purpose having a central section 54 to provide the upper surface or wall of the seat member 22, and adjacent sections, flaps and tongues defined by weakened lines 55 effected by scoring the blank 53 in the multiplicity of places indicated in Fig. 7. Section 56 of the blank 53 provides the front edge or wall of the seat, section 57 the front lower wall and sections 58 and 59, which are folded together as seen at 60 (Fig. 6), provide an internal reinforcement running lengthwise of the seat 22. Similarly at the rear margin of the seat, section 61 provides the rear wall thereof, section 62 the lower rear wall, and sections 63 and 64 are folded together as at 65 (Fig. 6) provide another reinforcing element running lengthwise of the seat. Section 61 constitutes rear wall 44.

When these sections are folded as described, and as seen in Figs. 3 and 6, the seat member includes a pair of box-like shapes, one 66 at the front margin of the seat and one 67 at the rear, which are arranged interiorly so to speak of the box-like shape of the seat member as a whole and greatly strengthening and reinforcing the seat member. To further reinforce it, a plurality of laminated cross-members 68 (Figs. 8 and 9) are provided which interlock with the reinforcing elements 60 and 65. As shown in Fig. 8, the cross-member 68 may be produced from a blank initially in the flat and scored as at 69 to be bent as at 70 upon itself. The member 68 has registering slots 71 cut in its opposite edges which edges provide the lower edges of the cross-member 68. To interlock with the cross-members 68, the sections 58—59 are sloted as at 72 and the sections 63 and 64 are sloted as at 73 in a plurality of places respectively. After the sections 58—59 and 63—64 are respectively folded into laminated arrangement as referred to, the slots 72 and 73 therein occur at the upper edges of the composite members 60 and 65 respectively to register with the slots 71 of the cross-reinforcements 68. Thus when assembled as shown in Figs. 3 and 6 the cross-members by reason of these interlocking and registering slots may be located with their ends in the box-shapes 66 and 67, respectively, and with their central portion 74, between the slots 71, located between the reinforcing elements 60 and 65 of the seat running lengthwise thereof. It will be seen that the seat is made to be slightly higher at the front than at the rear, and the cross members 68 are correspondingly tapered to accommodate this shape.

The blank 53 shown in Fig. 7 includes also a number of flaps and tongues formed as by scorings 75 running lengthwise of the blank at each side thereof and transversely of the scorings 55. A description will be given of left-hand side of the blank as seen in Fig. 7 and it is to be understood that the right-hand side thereof is the same. At the front of the seat blank, sections 59 and 58 have tongues 76 and 77, respectively, which when the sections 58 and 59 are folded together as seen at 60, are bent in opposite directions to form elements of the side wall of the seat member, as best seen in Fig. 6. Similarly, blank sections 64 and 63 have tongues 78 and 79, respectively, which are also bent in opposite directions to form elements in the side walls of the seat. The tongues 77 and 79 (one from the section 58 and the other from the section 63) overlap in the center area of the seat. The blank section 57 which forms the seat front lower wall has a tongue 80 which is bent upwardly to form one element of the side wall corner and this tongue is desirably scored as at 81 along a number of closely parallel lines to assist bending of the margin of the tongue 80 about the curve 82 in the section 57 which defines the front corner of the seat and corresponds with a similar curve 83 in the section 54 which defines the upper surface of the seat. Triangular cut-outs 84 separate scored end 81 of the tongue 80 and scored portion 90 of the tongue 89 from the blank section 57 for this purpose.

At the rear of the seat, the blank section 62 has a tongue 85 which is bent upwardly to provide an element in the side wall of the seat. The tongue 80 when bent up overlaps the tongue 76, and the tongue 85 when bent up overlaps the tongue 78. Before the tongue 78 is bent laterally and the tongue 85 bent up, a tongue 86 on the section 61 providing the rear wall of the seat is bent inwardly as seen in Fig. 6 to constitute an element of the side wall of the seat, lapped by the tongue 78 and the tongue 85.

After the parts are folded as just described, the flap 87 on the section 54 is bent down to form another element in the side wall of the seat lapping all of the tongues previously described. This flap 87 is cut out as at 88 to receive and be flush with the tongue 89 on the section 56 which is finally folded laterally to complete the side wall structure of the seat at the corner 33 or 34 as the case may be. The tongue 89 is scored in a series of closely parallel lines 90 to facilitate bending around the corner and to conform to the curves 82 and 83. The flap 87 and the tongue 89 are secured to the other side parts by the staples 37 previously referred to and shown most clearly in Fig. 2.

Turning now to the development of the back member 23, this is shown in Figs. 10, 11 and 12, Fig. 12 showing a blank 91 initially in the flap for this purpose and arranged as follows:

Section 92 of the blank 91 provides the back wall of the built-up back member, section 93 the upper wall, section 94 the front wall, and section 95 the lower wall. Section 95 has an auxiliary section 96 extending therefrom. The blank is scored transversely on lines 97 to define these sections. When section 94 is folded over unto section 92 the auxiliary section 96 is folded inwardly as indicated in Fig. 10 to complete the box-shape of the back and is stapled as at 98 to the section 92. Holes 99 are provided in the section 95 so that a jaw of a stapling machine may be inserted for this purpose. When so folded it will be seen that the section 92 is of greater vertical extent than section 94, thereby providing the depending skirt 41 as shown in Figs. 2 and 4.

The blank 91 has side flaps and tongues which are bendable along the score lines 100 transversely to the score lines 97. The flaps and tongues at one side of the blank will be described, with the understanding that the other side of the blank is similarly constructed and that a description of one will suffice.

Blank section 94 has a flap 101 which is bendable rearwardly, and section 92 has a flap 102 which is bendable forwardly over the flap 101. Corresponding corners of the blank sections 92 and 94 such as 103 and 104 respectively are rounded or curved to provide the upper corner of the back member, and the top wall section 93 has a tongue 105 which is bent around the corner curves 103—104. To accommodate this action the tongue 105 has a plurality of closely spaced apart parallel scorings 106 and the top end of flap 101 has similar scorings 107. Flap 102 is cut out as at 108 to accommodate the tongue 105 and to permit the tongue 105 and flap 102 to lie flush along the side of the back member. Section 95, which provides the bottom wall of the back member, has a tongue 109 that is bent down to interiorly lap the lower end of the flap 102 and with the lower end of the flap to provide the depending side bib 40 of the back member as shown in Figs. 1 and 2. When these flaps and tongues are folded as described they are secured in such folded position by the staples 38 previously referred to.

The flaps and tongues described provide an extremely strong structure even though the material be cardboard or paperboard. The term cardboard or paperboard as here used is to be understood to include any light-weight inexpensive material which is bendable as herein described.

Section 61, which constitutes seat rear wall 44, is inclined as best seen in Figs. 3 and 4 to accommodate the rearward inclination of the back 23.

Felt strip 32 in addition to serving as filler padding is desirably made narrower than the thickness of the back member 23 so as when centrally located along the sides and top of the latter to be advantageously spaced from the edges thereof. As a desirable result a space is provided along said edges to receive the seams of the back member seat cover 24a, thus adding to the smoothness of the seat cover by preventing unsightly bulges where the seams occur.

Desirable smoothness is further contributed to by the flush arrangements of the flaps 87 and tongues 89 on the seat, and the flaps 102 and tongues 105 on the back.

It is to be understood that the invention is not limited to details of construction shown for purposes of exemplification of an illustrative form. Furthermore, it may not be essential at all times that all features of the invention be used conjointly since various combinations may be employed within the scope of the present novel disclosure as defined in the appended claims.

What is here claimed is:

1. In a built-up cardboard form for automobile seat cover display simulating an automobile seat member and back member, means providing a smoothly rounded corner construction therefor comprising a pair of adjacent spaced apart substantially parallel panels, a connecting panel integral with both said adjacent panels and at approximately right angles thereto, a bendable tongue at an end of the connecting panel, said tongue having an intermediate portion multi-scored for bending in a pronounced arc, a first flap on one of said adjacent panels adjacent said tongue, said first flap at its end nearest the tongue also being multi-scored for bending in the same arc, corners of the adjacent panels adjacent said tongue on opposite sides thereof being rounded to substantially determine said arc, whereby the first flap end may be bent to conform to said rounded corners and the tongue similarly bent therearound over said first flap end, the tongue having an un-scored termination and the other of said adjacent panels having a second flap bent over said first flap, the end of said second flap and said tongue termination being irregularly matingly margined to lie closely co-planar, and staples securing the flaps and tongue together.

2. In a built-up cardboard form for automobile seat cover display simulating an automobile seat member and back member, means providing a smoothly rounded corner construction therefor comprising a pair of adjacent spaced apart substantially parallel panels, a connecting panel integral with both said adjacent panels and at approximately right angles thereto, a bendable tongue at an end of the connecting panel said tongue having an intermediate portion multi-scored for bending in a pronounced arc, a flap on one of said adjacent panels adjacent said tongue, said flap at its end nearest the tongue also being multi-scored for bending in the same arc, corners of the adjacent panels adjacent said tongue on opposite sides thereof being rounded to substantially determine said arc whereby the flap end may be bent to conform to said rounded corners and the tongue similarly bent therearound over said flap end.

3. In a built-up cardboard form for automobile seat cover display simulating an automobile seat member and back member, means providing a smoothly rounded corner construction therefor, comprising, a pair of adjacent spaced apart substantially parallel panels, a connecting panel integral with both said adjacent panels and at approximately right angles thereto, a bendable tongue at an end of the connecting panel said tongue having a portion multi-scored for bending in a relatively small radius arc, a flap on one of said adjacent panels adjacent said tongue, said flap at its end nearest the tongue also being multi-scored for bending in the same arc, corners of the adjacent panels adjacent said tongue on opposite sides thereof being rounded to substantially determine said arc, whereby the tongue and flap end may be bent to conform to said rounded corners of the adjacent panels while lying in a plane substantially at right angles to said adjacent panels.

4. A built-up integral cardboard form for automobile seat cover display simulating an automobile seat member, comprising portions thereof bent respectively to form an upper wall, a front wall, and a rear wall, tripartite extension sections extending from each of said front and rear walls, said extension sections being bent to form a pair of bottom walls and then again bent to form a pair of spaced apart reinforcements extending toward the upper wall, each said reinforcement being formed of laminations provided by the outermost of two of said tripartite extensions respectively bent upon themselves, and a pair of laminated cross-members extending transversely of said reinforcements from front to rear walls, said cross-members being slotted on their lower edges to receive and lock with the reinforcements respectively, and said two of said tripartite extensions being correspondingly slotted to receive said cross-members respectively.

5. A built-up integral cardboard form for automobile seat cover display simulating an automobile seat member, comprising, portions thereof respectively bent to form an upper wall, a front wall, and a rear wall, a pair of extension sections extending from each of said front and rear walls, said extension sections respectively being bent to form a pair of bottom walls and then again bent to form a pair of spaced apart reinforcements extending toward the upper wall, a pair of cross-members extending transversely of said reinforcements from front to rear walls, one of each of said cross-members and reinforcements being slotted on their intersecting edges to interengage and interlock, and side flaps and tongues on each of said walls and extensions overlapped to form ends for said seat member.

6. The structure of claim 5 wherein tongues on one of each of said extension sections extending from the front and rear walls respectively and which are bent to form the reinforcements are overlapped between the reinforcements, and tongues extending from all of said walls are bent to form laminated end walls respectively.

7. In a built-up integral cardboard form for automobile seat cover display simulating an automobile seat back member, comprising portions thereof bent respectively to form, a front wall, a rear wall, a top wall, and a bottom wall, the bottom wall having an extension bent upwardly between the front and rear walls and secured to the rear wall, the rear wall having a portion depending below the bottom wall to provide a skirt, end flaps on the front and rear walls bent to overlap to provide end walls for the back member, the outer of said flaps having an irregularly shaped upper edge and there being a tongue on the upper wall having an edge shaped complementarily to said flap irregularly shaped upper edge and bent down into flush adjacency therewith and means securing the flaps and said tongue together at the said ends respectively.

8. In a built-up integral cardboard form for automobile seat cover display simulating an automobile seat back member, comprising, portions thereof bent respectively to form a front wall, a rear wall, a top wall, and a bottom wall, the bottom wall having an extension bent upwardly between the front and rear walls and secured to the rear wall, the rear wall having a portion depending below the bottom wall to provide a skirt, flaps on the front and rear walls bent to overlap to provide end walls for the member, one of said flaps at each end being continued downwardly coterminous with the depending portion of the rear wall, said last mentioned flap having an irregularly shaped upper edge and there being a tongue on the upper wall having an edge shaped complementarily to said flap irregularly shaped edge and bent down into flush adjacency therewith.

9. The structure of claim 8 wherein the bottom wall has a flap at each end bent to lap the flap which is continued downwardly coterminous with the depending portion of the rear wall and secured to said last mentioned flap.

10. In a two-part form for automobile seat cover display simulating an automobile seat and back respectively, in combination, a built-up integral cardboard seat member adapted to lie horizontally, a built-up integral cardboard back member adapted to stand somewhat vertically at the rear of the seat member, said back member having a depending skirt for lapping the rear wall of the seat member and depending side bibs for lapping the side walls of the seat member respectively whereby the skirt and bibs form a three-sided hollow enclosure to receive the rear margin of the seat member, said seat member having a front wall merging by rounded corners into its side walls and said back member having an upper wall merging by rounded corners into its side walls, and both having adjacent walls cut away to accommodate said rounded corner respectively and means securing the skirt and bibs to the seat member after separate formation of the seat member and back member, said means being readily releasable.

11. The structure of claim 10 wherein the back member and seat member are faced with padding upon their adjacent front and upper faces respectively, the padding for each part being cambered to cause it to slope toward the edges of the seat member and back member respectively.

12. The structure of claim 10 wherein the rear wall of the seat member is inclined rearwardly and the upper wall of the seat member is inclined upwardly from the upper end of said seat member rear wall, and the lower edge of the back exclusive of said skirt and bibs rests on the rear margin of said upwardly inclined wall of the seat member, the skirt and bibs receiving the seat member rear margin somewhat telescopically with said skirt lapping the said rearwardly inclined wall whereby the back member is tilted rearwardly from the seat member.

13. The structure of claim 10 wherein the said means includes a plurality of U-shape members receiving and frictionally gripping the lapping adjacent walls of the back member and seat member, said U-shape members being passed upwardly over the lapping lower edges of said walls.

14. The structure of claim 10 wherein the upper and end walls of the seat member carry a felt facing strip spaced from the edges of said walls.

References Cited in the file of this patent

UNITED STATES PATENTS

| | | |
|---|---|---|
| 1,131,948 | Osborn | Mar. 16, 1915 |
| 1,188,825 | Potter | June 27, 1916 |
| 1,686,834 | Nickerson | Oct. 9, 1928 |
| 2,313,362 | Rous | Mar. 9, 1943 |
| 2,331,753 | Wohlers | Oct. 12, 1943 |
| 2,390,546 | Mather | Dec. 11, 1945 |
| 2,479,453 | Amatel | Aug. 16, 1949 |
| 2,575,548 | Carter | Nov. 20, 1951 |
| 2,644,508 | Weill | July 7, 1953 |
| 2,675,955 | Gibbons | Apr. 20, 1954 |